No. 848,639. PATENTED APR. 2, 1907.
W. P. CRARY.
SUPPORT FOR GAS GENERATORS.
APPLICATION FILED MAY 26, 1906.

WITNESSES

INVENTOR
William P. Crary,
BY
Charles R. Searle
ATTORNEY

UNITED STATES PATENT OFFICE.

WILLIAM P. CRARY, OF NEW YORK, N. Y.

SUPPORT FOR GAS-GENERATORS.

No. 848,639.  Specification of Letters Patent.  Patented April 2, 1907.

Application filed May 26, 1906. Serial No. 318,790.

*To all whom it may concern:*

Be it known that I, WILLIAM P. CRARY, a citizen of the United States, residing in the city of New York, borough of Manhattan, in the county and State of New York, have invented a certain new and useful Improvement in Supports for Gas-Generators, of which the following is a specification.

The invention relates to means for attaching acetylene-gas generators to vehicles; and the object of the invention is to provide a simple and efficient carrier especially designed for service with a bicycle, motor-cycle, or the like in which lack of space precludes the convenient location and support of a generator by ordinary means.

The invention consists in certain novel features and details of construction by which the above objects are attained, to be hereinafter described.

The accompanying drawings form a part of this specification and show an approved form of the invention.

Figure 1:
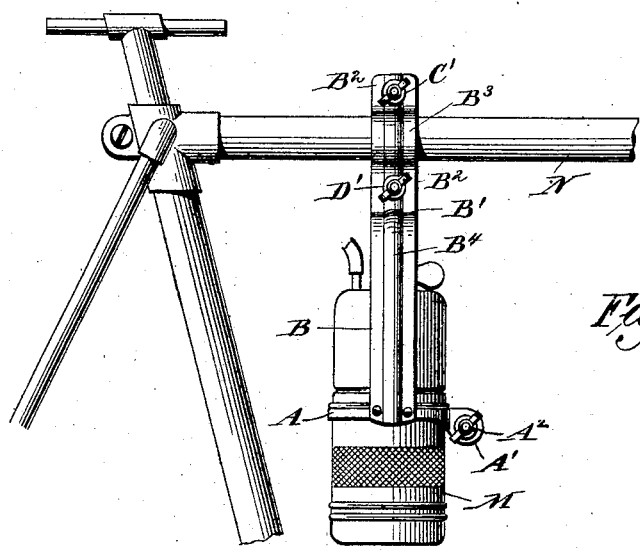
Figure 2:
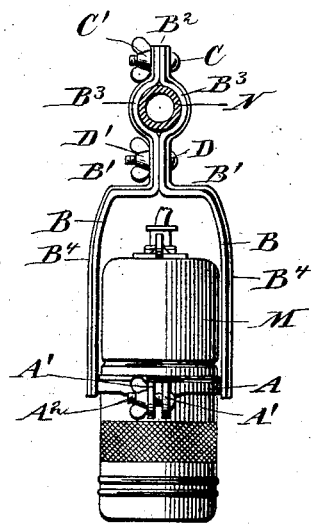

Figure 1 is a side view of a portion of a bicycle with the support attached thereto and holding a generator. Fig. 2 is a corresponding front view of the support and generator. The top brace of the bicycle, to which the support is secured, is shown in cross-section.

Similar letters of reference indicate the same parts in both figures.

It is desirable to carry on a bicycle or motor-cycle a generator of greater capacity than that usually supplied as part of the acetylene bicycle-lamp and also to locate the control of the water-supply thereto within easy reach of the rider. To accomplish these ends, I have devised the support shown, adapted to be attached to the top brace or upper horizontal bar of the vehicle in advance of the seat-post, in which a generator of considerable capacity may be conveniently carried both in regard to available space on the machine and easy manipulation by the rider. The lamp may be located where desired, gas being conveyed thereto through a flexible tube, as usual.

The support consists of an open ring A, having lugs A' extending from the ends and receiving a thumb-bolt A², by which the ring can be strongly contracted around the cylindrical body of a generator M, with the upper edge of the ring preferably engaged with an annular bead or other projection on such body. On each side of the ring is a vertical arm B, riveted or otherwise fixed thereto, extending upwardly to a point above the top of the generator, where each is bent toward the other, as at B', leaving sufficient space for the manipulation of the water-supply in the generator and the attachment of the gas-tube. The ends B² of the arms are again bent to the vertical, as shown, and extend parallel with each other, excepting an outward oppositely-located semicircular curve B³ in each adapted to encircle the top brace N of the machine.

Bolts C and D, provided with thumb-nuts C' D', extend through the ends B² above and below the curves and serve in securely clamping the support to the top brace.

The ring and arms are formed by suitable dies from sheet metal, and the arms are stiffened by stamping therein the longitudinal ribs or beads B⁴.

By slackening or removing the bolt A² the generator may be removed for recharging without disturbing the attachment to the top brace, the spring of the arms permitting the ring to be sufficiently distended for such removal. This spring action also serves automatically to engage the generator when replaced and holds it while the bolt A² is again inserted and tightened to insure the engagement.

I claim—

An open ring, outwardly-extending lugs on the ends thereof, and a bolt extending through said lugs, in combination with upwardly-extending arms secured to said ring at opposite points thereon and having their upper ends bent toward each other and again bent to form parallel vertical extensions, a semicircular curve in each of said extensions, each of said curves adapted partially to encircle a bar or like member of a vehicle-frame, a bolt extending through said extensions below said curves and a bolt extending through said extensions above said curve, all constructed and arranged to be clamped to said bar and support a gas-generator held in said ring.

In testimony that I claim the invention above set forth I affix my signature in presence of two witnesses.

WILLIAM P. CRARY.

Witnesses:
 CHAS. A. HAUCK,
 CHARLES R. SEARLE.